Patented June 28, 1932

1,865,146

UNITED STATES PATENT OFFICE

JAMES M. SHERMAN, OF ITHACA, NEW YORK, ASSIGNOR TO THE WILBUR WHITE CHEMICAL COMPANY, OF OSWEGO, NEW YORK, A CORPORATION OF NEW YORK

PROPIONIC ACID FERMENTATION BY THE USE OF MIXED STRAINS OF PROPIONIC BACTERIA

No Drawing. Application filed May 17, 1928. Serial No. 278,646.

The present invention relates to mixed strains of propionic bacteria, and to a process for the acceleration of propionic fermentation involving the use in admixture of a plurality of strains of the said bacteria.

The invention is based upon my discovery of the fact that the rate of production, and the yield, of propionic acid compounds including propionic acid and propionates by the propionic fermentation of carbohydrate-containing material and/or salts of organic acids such as for example salts of lactic acid may be increased by the use, in the fermentation procedure, not of a single pure strain of organisms of the type of *Bacterium acidi propionici* but of an admixture or association of a plurality of strains of organisms of the said type.

In carrying out this improvement I have made use of mixtures,—e. g., mixed cultures,—containing a plurality of varieties of propionic organisms including those varieties which have been described in the literature under the names:

(1) *Bacterium acidi propionici*;
(2) *Bacterium acidi propionici*, strain "a";
(3) *Bacterium acidi propionici*, strain "b";
(4) *Bacterium acidi propionici*, strain "c";
(5) *Bacterium acidi propionici*, strain "d"; and
(6) *Bacterium acidi propionici*, strain "rubrum".

Of the above,—(1), (2) and (3) are described by Von Freudenrich and Orla-Jensen in "Landw. Jahrb. Schweiz", 20 (1906), 320; (4) is described by Troili-Peterson in "Centr. Bakt. Parasitenk.", 1909, Abt. 2, 24, 333; (5) is described by Sherman in "Jour. Bact.", 6 (1921), 379; and (6) is described by Thöni and Alleman in "Centr. Bakt. Parasitenk.", 1910, Abt. 2, 25, 15–30.

I have found that the substitution, in an otherwise ordinary fermentation procedure, of a culture containing all, or a plurality less than all, of the above named varieties of organisms for a culture consisting of but one of the said pure strains, effects an acceleration of the rate of production of propionic acid, and, as well, an increase in the yield, from a fermentable medium. While it is realized that the characteristics of the strains of propionic bacteria hereinbefore mentioned may vary somewhat depending upon the methods of cultivation employed and other environmental factors, nevertheless, my invention comprises the use of a culture containing all, or a plurality less than all, of the said strains.

For example, I have found to be very effective a specific mixture of the six varieties of propionic bacteria hereinbefore named. Of the various possible combinations containing less than all of the named varieties, I have found the combination consisting of

*Bacterium acidi propionici*, strain "a",
*Bacterium acidi propionici*, strain "d", and
*Bacterium acidi propionici*, rubrum to possess substantially equivalent activity to that of the mixture containing all six of the named varieties.

Illustrative of the increased activity of cultures containing a plurality of strains of propionic organisms over the activity of cultures containing but a single pure strain thereof: In comparative tests conducted under identical conditions (except of course as to the identity of the fermentation agent), it has been found that, to obtain a concentration of propionic acid of 3%, the fermentation using a culture consisting exclusively of *Bacterium acidi propionici* "d" required 5 days, whereas the same concentration of propionic acid was effected in 4 days or less when using a mixed culture containing

*Bacterium acidi propionici*
*Bacterium acidi propionici*, strain "a"
*Bacterium acidi propionici*, strain "b"
*Bacterium acidi propionici*, strain "c"
*Bacterium acidi propionici*, strain "d"
*Bacterium acidi propionici* rubrum It has been found, further, that the above-described propionic fermentation procedure involving the use of a plurality of strains or varieties of the propionic organisms may, with economic advantage as to acceleration of production rate, be modified by the use therewith of certain organisms which do not of themselves produce propionic acid or propionates but are known to have the capacity of increasing the chemical activity of the said propionic organisms. Such added organisms, the use of which is described in U. S. Patent No. 1,459,959, may for example be selected from one or more of the groups typified by (1) *Lactobacillus casei* and *Streptococcus lactis;* (2) *Proteus vulgaris;* and (3) *Bacterium alcaligenes.*

Again, I have found that the hereinbefore described cultures containing a plurality of strains or varieties of propionic bacteria may with marked success be used in connection with the procedure described in my co-pending application Serial No. 272,863, filed April 25, 1928, which latter consists in effecting propionic fermentative action in the presence of an artificially increased mass of the organisms,—particularly, of organisms in a state of physiological youth.

Thus, for example, I have found it advantageous to ferment a suitable medium with a culture containing a plurality of strains of propionic bacteria under such conditions as make possible, during the fermentation operation, the withdrawal of fermented medium and the addition of fresh medium with the retention of a large proportion of the organisms, the mass of retained organisms serving as a mass inoculum for the succeeding charge of fermentable medium, whereby upon repetition the fermentation is initiated quickly and is accelerated in rate, due to the resulting artificially increased mass of organisms.

The retention of organisms in the fermentation zone may, for example, be effected by carrying out the fermentation in the presence of a finely divided or porous inert substance such as limestone, sand, charcoal, argillaceous material or the like.

It is to be understood that, in inoculating with a plurality of pure strains of propionic organisms, there may be used a mixed culture consisting of or containing the selected strains, or, if found desirable, the selected strains may be separately propagated and thereafter transferred to the fermentation chamber as individual inoculations.

I claim:

1. Process for the production of propionic acid compounds from carbohydrates or other suitable fermentable media by the fermentative action of propionic organisms, characterized by the use of a plurality of strains of organisms of the type of *Bacterium acidi propionici.*

2. Process for the production of propionic acid compounds from carbohydrates or other suitable fermentable media by the fermentative action of propionic organisms, characterized by the use of a mixed culture containing *Bacterium acidi propionici* strain *a*, *Bacterium acidi propionici* strain *d* and *Bacterium acidi propionici rubrum.*

3. Process for the production of propionic acid compounds from carbohydrates or other suitable fermentable media by the fermentative action of propionic organisms, characterized by the use of a mixed culture containing *Bacterium acidi propionici*, *Bacterium acidi propionici* strain *a*, *Bacterium acidi propionici* strain *b*, *Bacterium acidi propionici* strain *c*, *Bacterium acidi propionici* strain *d*, and *Bacterium acidi propionici rubrum.*

4. A composition of matter comprising an admixture of a plurality of pure strains of organisms of the type of *Bacterium acidi propionici* in a fermentable medium.

5. A composition of matter comprising a fermentable medium containing in admixture a plurality of pure strains of the organisms *Bacterium acidi propionici* strain *a*, *Bacterium acidi propionici* strain *d* and *Bacterium acidi propionici rubrum.*

6. A composition of matter comprising a fermentable medium containing in admixture pure strains of the organisms *Bacterium acidi propionici*, *Bacterium acidi propionici* strain *a*, *Bacterium acidi propionici* strain *b*, *Bacterium acidi propionici* strain *c*, *Bacterium acidi propionici* strain *d*, and *Bacterium acidi propionici rubrum.*

7. Process for the production of propionic acid compounds from carbohydrates or other suitable fermentable media by the fermentative action of propionic organisms, characterized by the use of mixtures consisting essentially of a plurality of pure strains of organisms of the type of *Bacterium acidi propionici.*

8. Process for the production of propionic acid compounds from carbohydrates or other suitable fermentable media by the fermentative action of propionic organisms, characterized by the use of a mixed culture consisting essentially of pure strains of the organisms *Bacterium acidi propionici* strain *a*, *Bacterium acidi propionici* strain *d* and *Bacterium acidi propionici rubrum.*

9. Process for the production of propionic acid compounds from carbohydrates or other suitable fermentable media by the fermentative action of propionic organisms, characterized by the use of a mixed culture consisting essentially of pure strains of the organisms *Bacterium acidi propionici*, *Bacterium acidi propionici* strain *a*, *Bacterium acidi propionici* strain *b*, *Bacterium acidi propionici* strain *c*, *Bacterium acidi propionici* strain *d*, and *Bacterium acidi propionici rubrum.*

In testimony whereof I affix my signature.

JAMES M. SHERMAN.

CERTIFICATE OF CORRECTION.

Patent No. 1,865,146.             June 28, 1932.

JAMES M. SHERMAN.

It is hereby certified that the residence of the assignee in the above numbered patent was erroneously described and specified as "Oswego, New York" whereas said residence should have been described and specified as Owego, New York, as shown by the records of assignments in this office; and that the said Letters Patent should be read with this correction therein that the same may conform to the record of the case in the Patent Office.

Signed and sealed this 1st day of November, A. D. 1932.

(Seal)                                              M. J. Moore,
                                                 Acting Commissioner of Patents.